(12) United States Patent
Baiko et al.

(10) Patent No.: US 8,018,514 B1
(45) Date of Patent: Sep. 13, 2011

(54) CHARGE INJECTION DEVICE CAMERA SYSTEM FOR RADIATION-HARDENED APPLICATIONS

(75) Inventors: Denis Baiko, Fairport, NY (US); Suraj Bhaskaran, Mendon, NY (US); Joseph Carbone, Liverpool, NY (US); Stephen Czebiniak, Port Crane, NY (US); Herbert Ziegler, Baldwinsville, NY (US)

(73) Assignee: Thermo Fisher Scientific Inc, Waltham, MA (US)

( * ) Notice: Subject to any disclaimer, the term of this patent is extended or adjusted under 35 U.S.C. 154(b) by 1166 days.

(21) Appl. No.: 11/800,141

(22) Filed: May 4, 2007

Related U.S. Application Data

(60) Provisional application No. 60/798,457, filed on May 4, 2006.

(51) Int. Cl.
*H04N 5/335* (2011.01)
(52) U.S. Cl. .......................... 348/307; 348/308
(58) Field of Classification Search .................. 348/307, 348/308
See application file for complete search history.

(56) References Cited

U.S. PATENT DOCUMENTS

| | | | |
|---|---|---|---|
| 5,332,903 A | | 7/1994 | Buehler et al. |
| 2004/0252211 A1* | | 12/2004 | Rhodes .................... 348/308 |
| 2006/0132633 A1* | | 6/2006 | Nam et al. ................ 348/308 |
| 2007/0040922 A1* | | 2/2007 | McKee et al. ............ 348/308 |
| 2007/0177043 A1* | | 8/2007 | Kok .......................... 348/308 |
| 2007/0188640 A1* | | 8/2007 | Xu ............................ 348/308 |
| 2007/0236590 A1* | | 10/2007 | Harris ...................... 348/308 |

OTHER PUBLICATIONS

Baiko et al., "CID25—Radiation Hardened Color Video Camera," SPIE presentation, 8 pgs., (Feb. 23, 2006).

* cited by examiner

*Primary Examiner* — Le Luu
(74) *Attorney, Agent, or Firm* — Sunstein Kann Murphy & Timbers LLP; Charles B. Katz

(57) ABSTRACT

An imaging system for deployment within a high-radiation environment. The imaging system has an imaging array of photosensitive pixels, each of which contains a sense gate for integrating photogenerated charge during the course of a frame and an amplifier transistor for sampling voltage on the sense gate. Each pixel also contains an inject gate and select and reset FETs, for operation as a charge injection device (CID). Moreover, a circuit including a monitor transistor on each polysilicon layer of the imaging array provides a threshold voltage monitor signal used to compensate a drive signal applied to the array on the basis of threshold voltage shifts induced by exposure to radiation. The array is contained within a remote head that may be evacuated and temperature-controlled and that may contain radiation-hardened drive electronics for generating drive signals upon receipt of a start pulse received from a camera control unit located at a significant distance from the remote head.

17 Claims, 7 Drawing Sheets

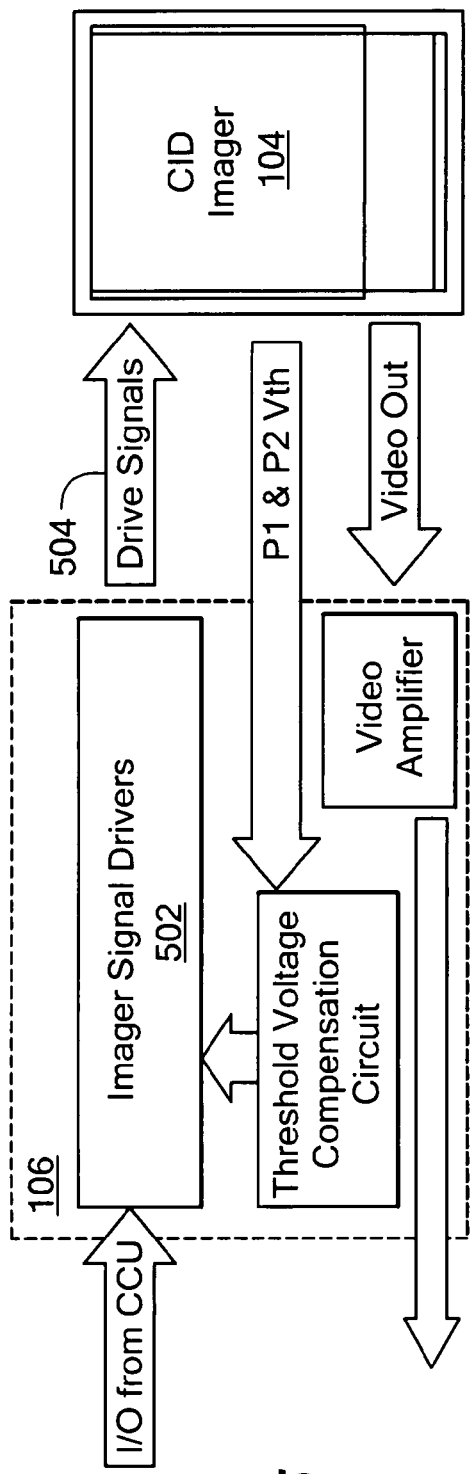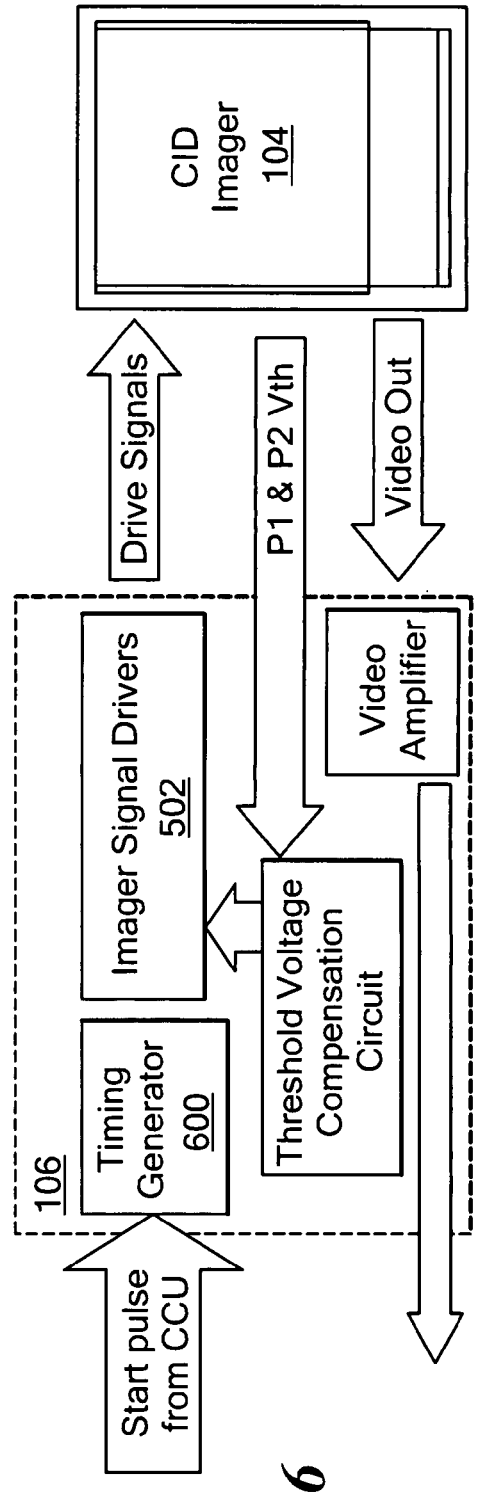
FIG. 5
FIG. 6

CHARGE INJECTION DEVICE CAMERA SYSTEM FOR RADIATION-HARDENED APPLICATIONS

The present application claims the priority of U.S. Provisional Patent Application Ser. No. 60/798,457, filed May 4, 2006, and incorporated herein by reference.

FIELD OF THE INVENTION

The invention relates generally to industrial video cameras, and more particularly to industrial video cameras for nuclear power plant monitoring and other applications that require radiation hardening.

BACKGROUND OF THE INVENTION

The nuclear power generation and other industries require radiation hardened camera systems for monitoring areas exposed to radiation. Typically, such camera systems consist of a radiation-hardened remote head positioned within the irradiated area, and a camera control unit (CCU) located at the control room or other area accessible to human operators. The remote head and CCU may communicate via a cable.

Basic Charge Injection Device (CID) imaging technology is described by Michon and Burke in "CID image sensing," *Charge-Coupled Devices*, (Springer, 1980), which is incorporated herein by reference. Thermo Fisher Scientific CIDTEC's MegaRAD™ camera, a solid state radiation-hardened monochrome camera based on CID technology has been available for a decade. Moreover, the use of OD-based color image sensors at the remote head is known, as well. However, while the CID benefits from inherent robustness in high-radiation environments, as with any solid state device, silicon-based or otherwise, under radiation, the CID image sensors are susceptible to damage by both ionizing energy loss (IEL) and non-ionizing energy loss (NIEL).

As used herein, and in any appended claims, the term "high-radiation environment" will refer to environments in which equipment is exposed to radiation of up to $10^6$ rad/hr. "Ionizing radiation" shall refer to radiation of sufficient energy to give rise to ionization of the gate oxide of an imager, whereas "non-ionizing radiation," as used herein and in any appended claims, shall refer to radiation capable of displacing silicon atoms in the imager substrate, unless the context dictates otherwise. Thus, insofar as IEL ionizes the gate oxide, IEL may result in degraded performance of the MOSFET (Metal-Oxide Semiconductor Field Effect Transistor) devices used for amplification of the photo-induced charge. The MOSFET degradation is mainly observed as a shift in the threshold voltage (Vth) of the device. This makes it difficult to turn an n-type MOSFET (NFET) 'off' or turn a p-type MOSFET (PFET) 'on'.

NIEL can lead to bulk damage such as displacement of silicon atoms in the epitaxial (EPI) layer. Such displacement gives rise to permanent defects which are, in turn, the primary cause of elevated dark current and poor charge transfer efficiency (CTE).

Against this background, there is a need in the art for a radiation-hardened CID-based camera system that avoids performance degradation arising from the IEL and NIEL effects described above and that provides for operator placement at significant distances.

SUMMARY OF THE INVENTION

In accordance with embodiments of the present invention, a video imaging system is provided for deployment in a high-radiation environment. The system has an array of photosensitive pixels, where each pixel, in turn, has (i) a sense gate for integrating photogenerated charge during the course of a frame, (ii) an inject gate for removing integrated charge from the sense gate via a lateral drain, (iii) an amplifier transistor for sampling voltage on the sense gate, (iv) a select transistor for addressing a particular pixel, and (v) a reset transistor for referencing the sense gate to a specified potential. The sense gate, amplifier transistor, select transistor and reset transistor collectively constitute polysilicon layer 1 transistors, and each is characterized by a threshold voltage. The video imaging system also has a first threshold voltage monitor that provides a first monitor output signal indicative of the threshold voltage of the polysilicon layer 1 transistors, and a threshold compensation circuit that governs the driving voltage applied to at least one of the sense gate, amplifier transistor, select transistor and reset transistor on the basis of the first monitor output signal.

In alternate embodiments of the invention, the first threshold voltage monitor may include a polysilicon layer 1 monitor transistor. Moreover, the video imaging system may also have a second threshold voltage monitor for providing a second monitor output signal indicative of the threshold voltage of the inject gate as modified by exposure to radiation, wherein the compensation circuit governs the driving voltage applied to the inject gate on the basis of the second monitor output signal.

In other embodiments of the invention, the array of photosensitive pixels may be disposed within a remote head, capable of exposure to at least one of non-ionizing and ionizing radiation, that may include radiation hardened electronics for driving the array of photosensitive pixels. The remote head may be, at least, partially evacuated, and may have a threshold compensation circuit for actively compensating drive signals supplied to the array of photosensitive pixels. Additionally, the remote head may also have a cooler for maintaining a temperature of the array of photosensitive pixels within a specified range of temperature, and may include imager signal drivers for driving the array of photosensitive pixels based upon receipt of a start pulse.

In yet further embodiments of the present invention, the video imaging system may also have a camera control unit for providing power and control signals to the array of photosensitive pixels and for processing signals received from the array of photosensitive pixels, as well as electronic coupling of the camera control unit to a remote head containing the array of photosensitive pixels. The electronic coupling may be by means of an electrical cable, in which case the camera control unit may also include a cable length compensation circuit.

In accordance with another aspect of the present invention, a method is provided for imaging in a high-radiation environment. The method has steps of:

a. providing an array of photosensitive pixels, the array characterized by a temperature, each pixel including:
   (i) a sense gate for integrating photogenerated charge during the course of each frame;
   (ii) an inject gate for removing integrated charge from the sense gate via a lateral drain;
   (iii) an amplifier transistor for sampling voltage on the sense gate;
   (iv) a select transistor for addressing a particular pixel; and
   (v) a reset transistor for referencing the sense gate to a specified potential, the sense gate, amplifier transistor, select transistor and reset transistor, collectively constituting polysilicon layer 1 transistors, each of the polysilicon layer 1 transistors characterized by a respective threshold voltage;

b. sampling voltage on the sense gate by means of the amplifier transistor associated with each photosensitive pixel;

c. monitoring a change in threshold voltage associated with the array of photosensitive pixels in order to derive a threshold voltage monitor signal; and c. compensating a drive signal applied to the array of photosensitive pixels for changes in threshold voltage due to radiation exposure based upon the threshold voltage monitor signal.

In other embodiments of the invention, the method may also include steps of maintaining the temperature of the array of photosensitive pixels within a specified range of temperature, as well as of generating drive signals within a remote head that includes the array of photosensitive pixels based upon a start signal received from a camera control unit disposed at a distance greater than 2 meters from the remote head.

In yet further embodiments of the invention, changes in the threshold voltage may be monitored by monitoring a first threshold voltage of a first monitor transistor associated with a first polysilicon layer of the array of photosensitive pixels, as well as by monitoring a second threshold voltage of a second monitor transistor associated with a second polysilicon layer of the array of photosensitive pixels.

BRIEF DESCRIPTION OF THE DRAWINGS

The foregoing features of the invention will be more readily understood by reference to the following detailed description, taken with reference to the accompanying drawings, in which:

FIG. 5 is a block diagram of one embodiment of the remote head for use with relatively short runs of cable connecting the remote head with the camera control unit, in accordance with certain embodiments of the invention;

FIG. 6 is a block diagram of a further embodiment of the remote head for use with longer runs of cable, in accordance with other embodiments of the present invention;

DETAILED DESCRIPTION OF EMBODIMENTS

Figure 1:
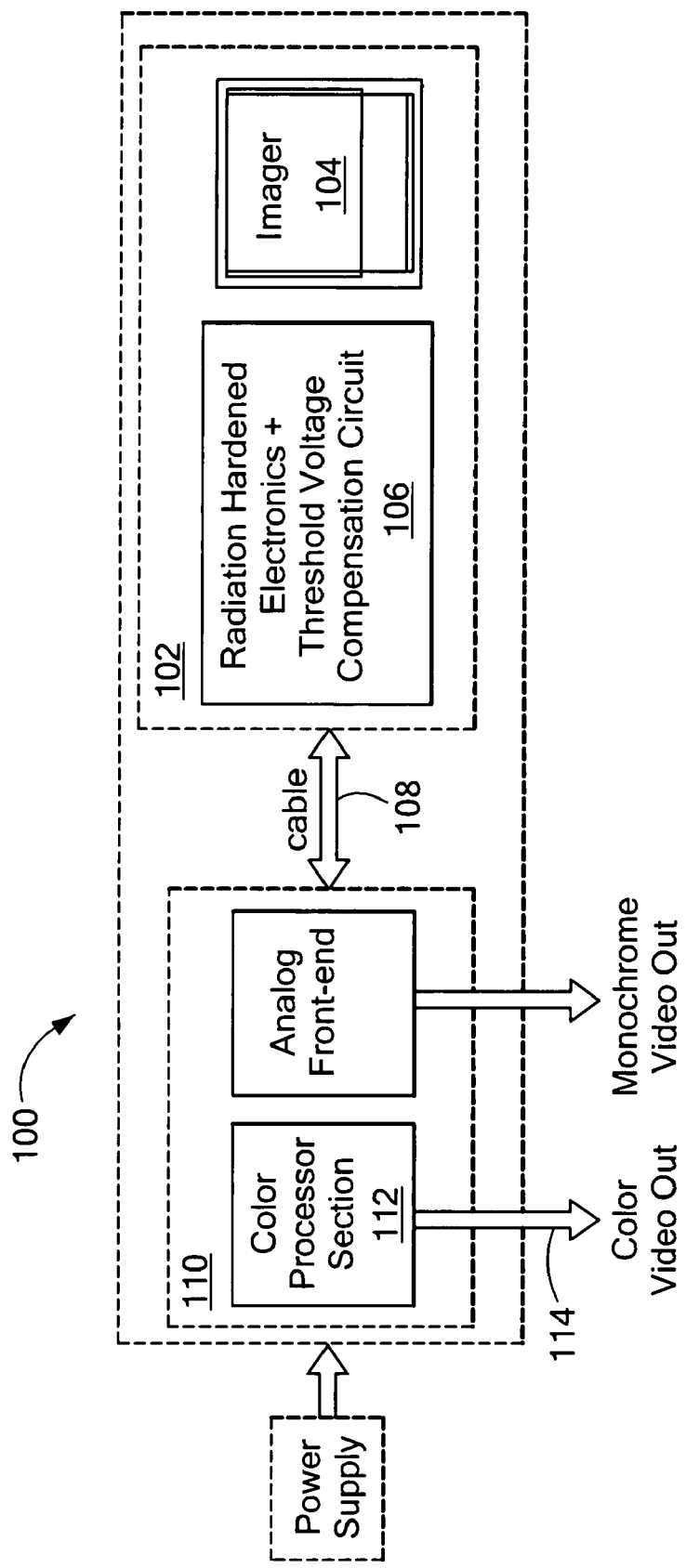
FIG. 1 is a symbolic top-level diagram of a radiation-hardened CID camera system according to an embodiment of the present invention.

In accordance with embodiments of the present invention, a radiation-hardened OD camera system is provided as designated generally by numeral 100 in FIG. 1, which depicts a symbolic top-level diagram of the camera system embodiment shown. The camera system 100 includes a radiation-hardened remote head 102 consisting of a color or monochrome radiation-hardened OD imager 104, and radiation-hardened electronics 106 for driving the OD imager. The remote head 102 is coupled via a cable 108 (which can be between 2-150 meters in length) to a camera control unit (CCU) 110 having the capability to generate both monochrome and color video. Cable 108 is typically between 2 and 150 meters in length. CCU 110 also provides the capability, as described below, to compensate for delays and distortion associated with long cable lengths. The foregoing components are described in greater detail below.

Radiation Hardened CID Imager

The CID imager, provided in accordance with preferred embodiments of the present invention, may advantageously serve as a color real-time video imager compliant with the NTSC TV standard. In this mode, a color processor 112 provides a video output signal 114 with two types of frames. In one frame, displayed lines are combinations of rows 1+2, 3+4 etc. In the other frame, the combinations are 2+3, 4+5 etc. These two frames alternate to produce 30 frames per second (fps) of NTSC video. The imager may also be operated advantageously in two monochrome modes. In the sequential mode, all frames are identical and are comprised of all the existing lines, read sequentially one after the other. In the RS170 mode, there are odd and even frames, which are alternated. In the odd frame only odd rows are displayed and vice versa. Such versatility is achieved through the row selection circuitry, which contains 2 independent shift registers, 1 for odd and 1 for even rows. The clocks that propagate a signal through a shift register are shared between the 2 shift registers. However, the data lines used for synchronization of odd and even rows are independent.

Figure 2:
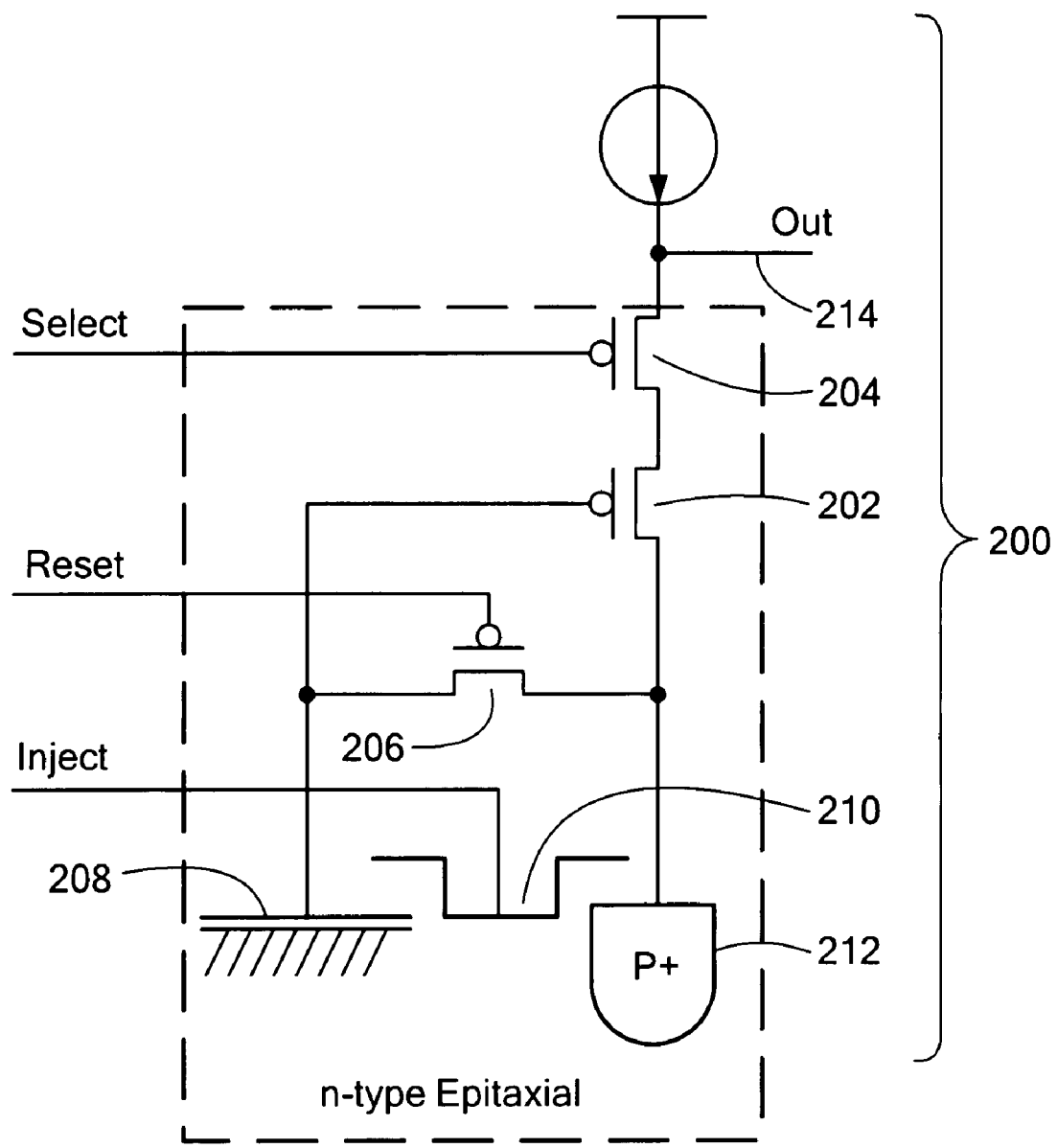
FIG. 2 is a schematic depiction of a single pixel of the imager, in accordance with an embodiment of the present invention.

CID imager 104 employs a preamplifier-per-pixel technology, whereby each pixel, designated generally by numeral 200, and now described with reference to FIG. 2, contains three transistors: an Amplifier Transistor 202, a Select Transistor 204, and a Reset Transistor 206. Additionally, each pixel consists of a single photogate 208 and an inject gate 210. Both gates are MOS capacitors and are fabricated using two layers of polysilicon ("poly"), referred to herein, respectively, as: "Poly1" for the Sense Gate and "Poly2" for the Inject Gate. Each layer of poly is characterized by a different dielectric (silicon dioxide) thickness. The functional schematic of the pixel is represented in FIG. 2.

Every pixel 200 contains a source follower FET 202 (equivalently referred to herein as the "Amplifier FET" or "Amplifier Transistor") that amplifies the photon-generated charge. The pixel integrates the charge under the Sense Gate 208 for the duration of a frame. The integrated charge is then removed (or injected) by switching 'ON' the Inject Gate 210, via a lateral drain 212. Simultaneously, the change of the photogate voltage is sensed by the Amplifier FET 202. The pixel sense node capacitance is preferably very small, thereby advantageously providing larger voltage signals at the pixel output 214, with a resultant enhancement of imager sensitivity.

Figure 3:
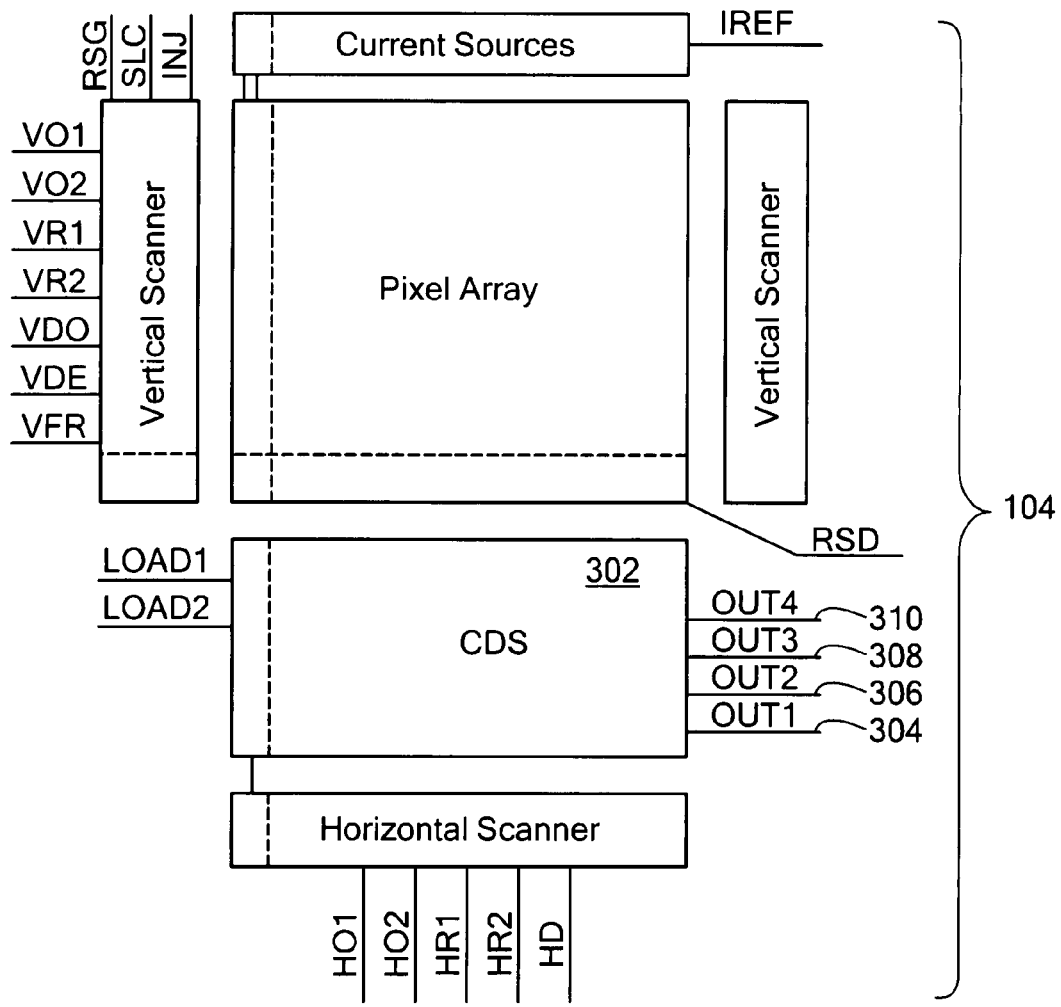
FIG. 3 is a block diagram of the imager and its pin-out, in accordance with an embodiment of the present invention.

In preferred embodiments of the invention, the CID imager 104 is equipped with correlated double sampling (CDS) circuitry 302, shown in the block diagram of FIG. 3. CDS generates two samples, proportional to pixel voltage before and after charge removal. The CDS advantageously reduces 1/f noise of the pixel source follower 202, "ktc" noise $$\sigma_{ktc} = \sqrt{\frac{kT}{c}};$$

k=Boltzmann's constant, T=temperature; c=capacitance of the sense node) due to reset switch 206, and fixed pattern noise associated with variation of various offsets such as variation of pixel FET threshold voltage. It is important to note that the transfer gate moves bidirectionally between the two samples, which greatly reduces any fixed pattern noise, associated with the capacitive coupling to the transfer gate that wouldn't be removed by the CDS.

CDS circuitry of the CID imager produces current-mode signal for both pixel samples simultaneously (using two output buses). In the color mode of operation, two samples for two rows are generated simultaneously (using four output buses 304, 306, 308, and 310). Moreover, the current-mode operation contributes to the imager's low noise performance.

CID imager 104 is preferably built using a CMOS-CID silicon process with PMOS transistors only, which contributes to its superior radiation hardness, for the following reasons. A FET is characterized by a threshold voltage, namely the gate voltage that causes a channel to form in the depletion zone for the flow of current from drain to source. When PMOS transistors are subjected to gamma radiation, charge trapped in the oxide makes the threshold voltage more negative. However, the device can be still turned 'OFF' or 'ON'. Turning it 'ON' will require more gate voltage due to the shift in the threshold voltage. NMOS transistors experience similar effect in radiation, but the threshold voltage approaches zero, making it a leaky switch or impossible to turn the transistor 'OFF'.

The CID imager is preferably cooled to a temperature of around 25° C., via a thermoelectric cooler or other suitable expedient, in order to minimize the dark current, particularly in the case that the camera is employed in an ambient environment with elevated as is often the case in high-radiation environments.

Radiation Hardened Remote Head Electronics

A radiation hardened camera system preferably comprises both a radiation hardened imager as well as circuitry to drive the imager which, in preferred embodiments of the present invention, should be radiation hardened as well. For this reason, integrated circuits (IC) based, typically, on junction field effect transistor (JFET) and bipolar junction transistor (BJT) technologies, may be employed for the drive electronics and should be verified by radiation testing.

In accordance with a preferred embodiment, an active feedback system is provided in the remote head electronics that compensates for the shift in threshold voltage when the imager is subjected to radiation. A circuit, described with reference to FIG. 4, monitors and compensates for a shift in threshold voltage that occurs due to protracted exposure to radiation, for both Poly1 and Poly2 transistors. The data from these FETs serves as a basis for the circuit that compensates for the shift in threshold voltage when exposed to radiation.

The Poly1 and Poly2 FETs 402, present in the imager 104, are used to monitor radiation-induced shifts in the respective FET threshold voltages, the shifts referred to, respectively, as $\Delta V_{th1}$ and $\Delta V_{th2}$. Gate 404 and drain 406 are tied together and the monitor transistor 402 is operated in the 'saturation' regime, i.e., the FET is powered 'ON' at all times, even during the course of radiation. In this respect, the monitor FET is used in a manner distinct from the use of a FET as a dosimeter as described by Buehler et al. in U.S. Pat. No. 5,332,903.

Preferably, the shifts in threshold voltage of both transistors, $\Delta V_{th1}$ and $\Delta V_{th2}$, are monitored and the drive signals to the imager are automatically adjusted for uninterrupted operation of the camera system, however active control of drive signals based on one or more monitored shifts in threshold voltage is also within the scope of the present invention.

Figure 4:
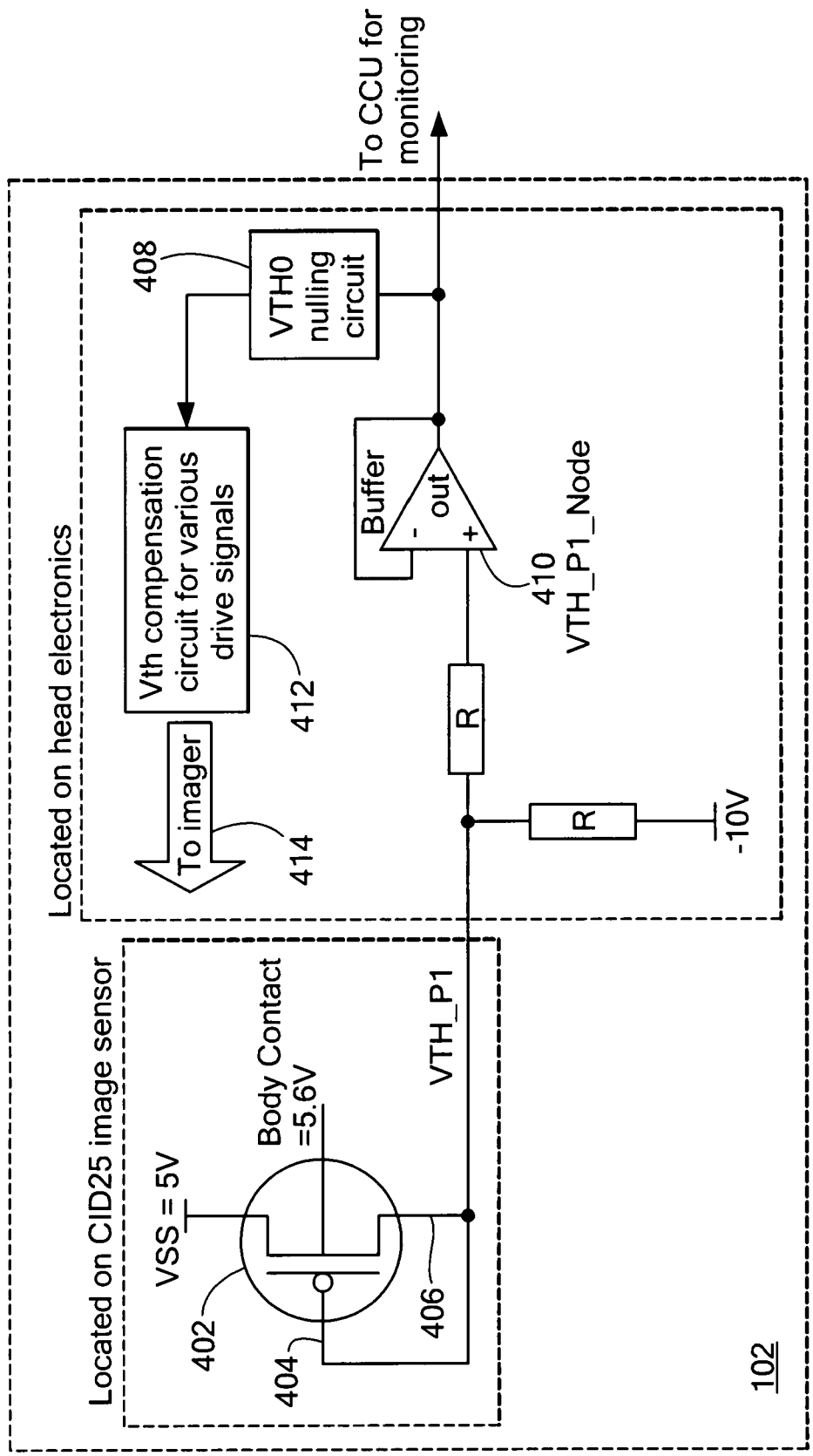
FIG. 4 is a schematic depiction of a threshold voltage compensation circuit, in accordance with an embodiment of the present invention.

A threshold voltage nulling circuit 408 subtracts $V_{th0}$ (the initial threshold voltage of transistor 402) from the threshold voltage as induced by radiation. When a threshold voltage shift occurs, only the actual shift ($\Delta$Vth) is sensed and compensated for. For example, if the initial threshold voltage $V_{th0}$ of the Poly1 PFET 402 is −1.2V, the threshold voltage nulling circuit 408 is used to set VTH_P1_Node 410 to zero Volts. When a shift of −1V occurs during radiation, the resulting threshold voltage at the gate of the MOSFET 402 is −2.2V. However, with the nulling circuit, the output of the buffer will only show a shift of −1V. The threshold voltage compensation circuit 412 then dynamically governs the drive signals 414 to the imager based on this level. While circuitry incorporating Poly1 transistor 402 is depicted in FIG. 4 by way of example, corresponding circuitry may be applied to compensate imager transistors of the Poly2 layer.

FIG. 5 depicts one embodiment of the remote head electronics 106 for use with relatively short cable runs (up to 50 meters) connecting the remote head 102 with the CCU 110 (all shown in FIG. 1). Timing signals are received from the CCU to drive Imager Signal Drivers 502, which, in turn, supplies Drive Signals 504 to CID Imager 104. FIG. 6 depicts a further embodiment of the remote head electronics 106, wherein a timing generator circuit 600 is incorporated in the remote head electronics 106 to support cable lengths longer than 50 meters. Timing-generator board 600 comprises programmable read-only memory (PROM) based on radiation hardened transistor-transistor-logic (TTL) technology, thereby making it possible, based solely on receipt of a start pulse 602 to drive the remote head imager signal drivers 502, and, thus, the CD imager 104, with cables longer than 50-meters. It is to be understood that electronic coupling of the remote head and the CCU, by means other than cable, such as wirelessly by radio or optically, is similarly within the scope of the present invention.

Figure 7:
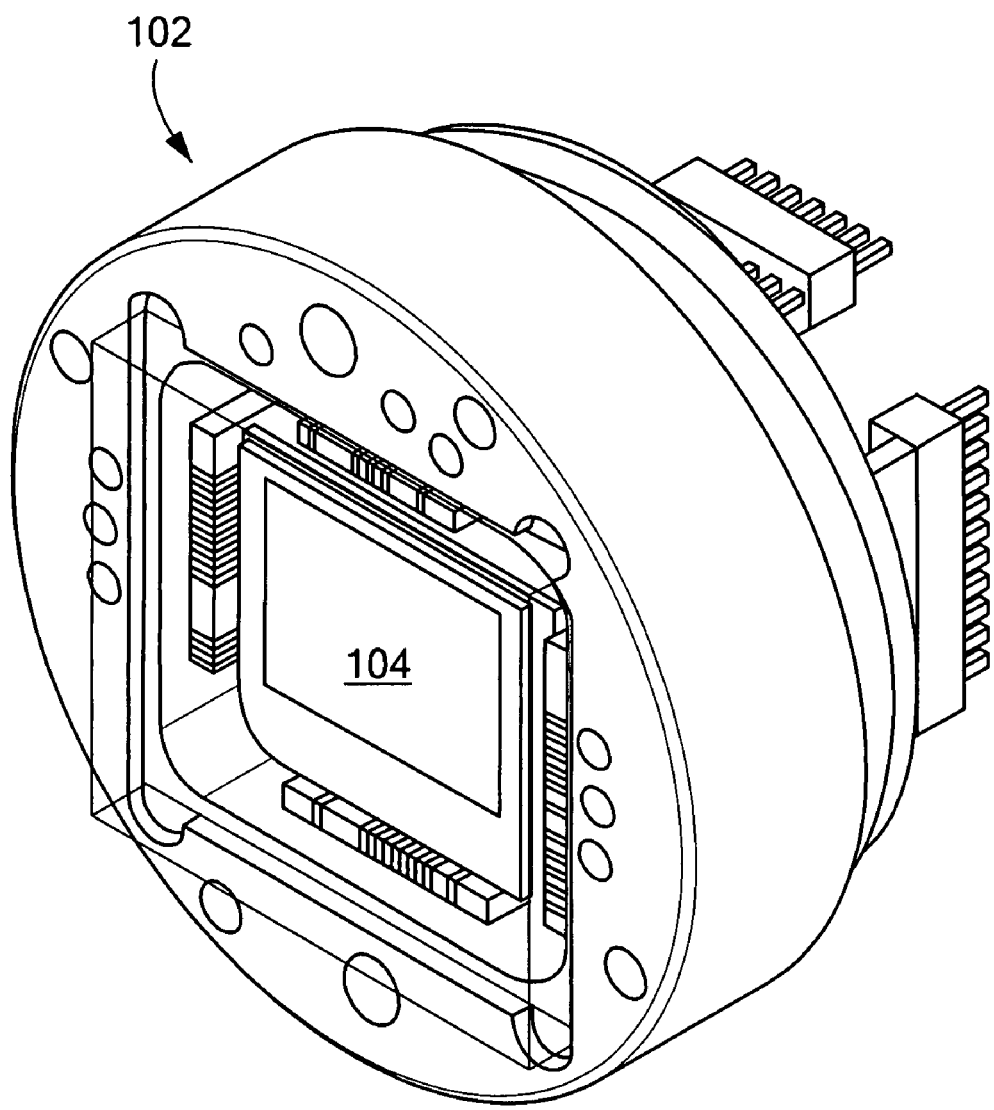
FIG. 7 is a perspective view of the radiation hardened remote head, in accordance with embodiments of the present invention.

Imager 104 and remote head electronics 106 (shown in FIG. 1) are enclosed within remote head 102 which may preferably be sealed in an integral unit, shown in FIG. 7, to allow evacuation or partial evacuation of the volume of the remote head in order to facilitate temperature control. The imager temperature is preferably maintained within a specified range of temperature, typically below that of ambient temperature, for example, within a narrow range about 25° C., in order to keep the dark current induced by radiation damage at a low level. Cooling may be provided by a Peltier effect thermo-electric cooler, or by other cooling means.

Camera Control Unit (CCU)

Figure 8:
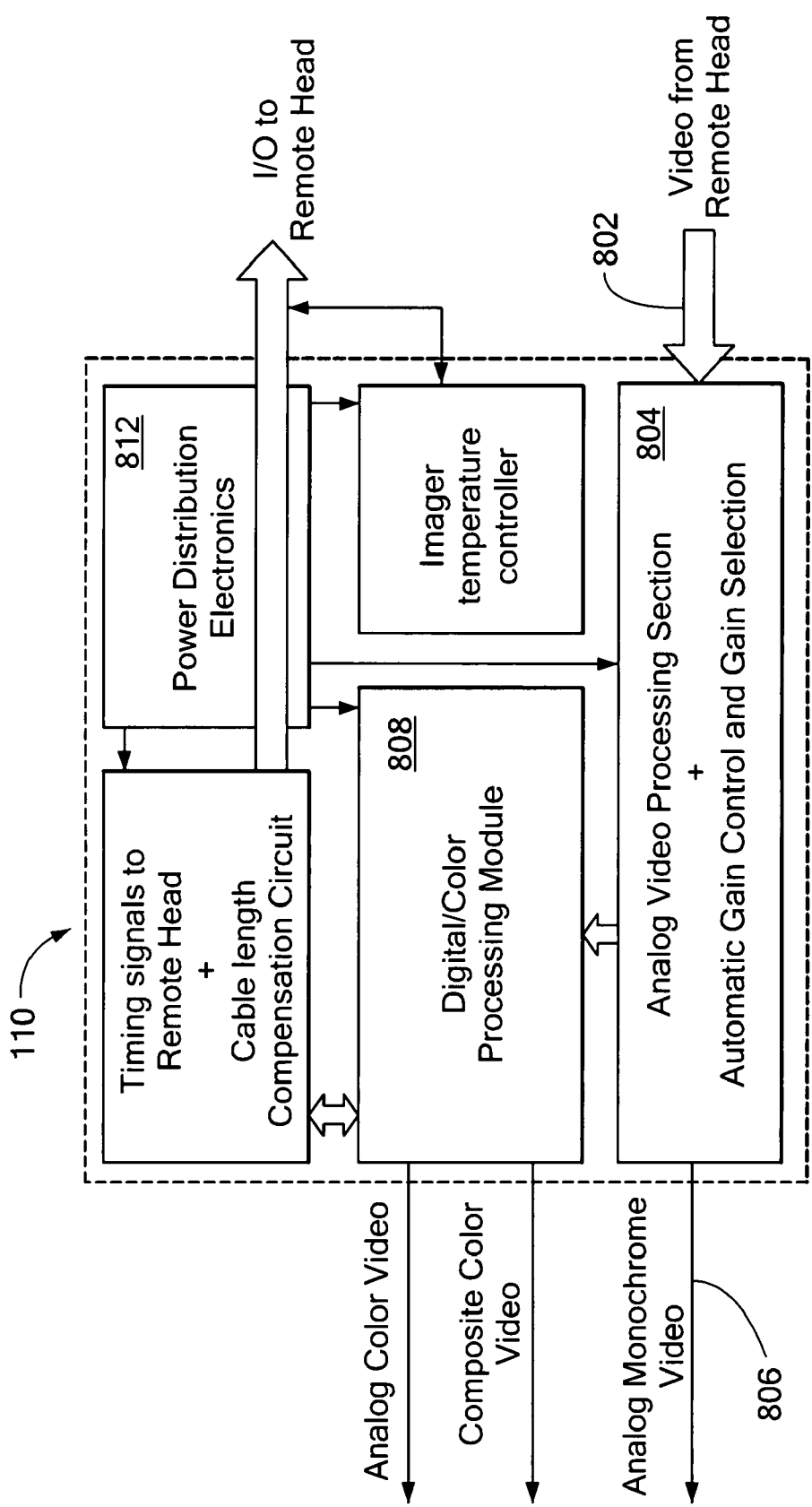
FIG. 8 is a top-level block diagram of the camera control unit (CCU) in accordance with embodiments of the present invention.

FIG. 8 shows the top-level block diagram of the CCU 110. CCU 110 is not designed to be exposed to radiation, and, indeed, it typically employs components that can be damaged by radiation. Video signal 802 from the remote head 102 (shown in FIG. 1) is processed by an analog video processing section 804, which typically also contains an Automatic Gain Control (AGC) and fixed gain electronics. Monochrome video 806 is generated by the analog video section 804. This signal is then fed to a digital/color processing section 808, which, in turn, generates composite video 810 and analog color video 812 output signals. Digital video at various frames per second may be generated by this section as well and is within the scope of the present invention.

CCU 110 preferably has built-in capability to compensate for signal delays associated with long cable length by delaying or advancing the video signal from the head, typically at 6 ns increments, for optimum color sampling.

Power distribution electronics 812 of the CCU provide power for the camera system as well as power for imager temperature control 814. As noted above, the imager temperature may be maintained at a reduced (relative to ambient) temperature, for example, within a range surrounding 25° C., in order to keep the dark current induced by radiation damage at a low level, particularly when the camera is operated in warmer ambient environments, as is often the case in high-radiation environments. It is to be understood that while the power distribution electronics 812 and temperature control 814 are shown as part of the CCU by way of example, their location anywhere within the system is within the scope of the present invention.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A video imaging system for deployment in a high-radiation environment, the system comprising:
   a. an array of photosensitive pixels, each pixel including:
      (i) a sense gate for integrating photogenerated charge during the course of a frame;
      (ii) an inject gate for removing integrated charge from the sense gate via a lateral drain;
      (iii) an amplifier transistor for sampling voltage on the sense gate;
      (iv) a select transistor for addressing a particular pixel; and
      (v) a reset transistor for referencing the sense gate to a specified potential, the sense gate, amplifier transistor, select transistor and reset transistor collectively constituting polysilicon layer 1 transistors, each of the polysilicon layer 1 transistors characterized by a respective threshold voltage;
   b. a first threshold voltage monitor for providing a first monitor output signal indicative of the threshold voltage of the polysilicon layer 1 transistors;
   c. a threshold compensation circuit for governing a driving voltage applied to at least one of the sense gate, amplifier transistor, select transistor and reset transistor on the basis of the first monitor output signal.

2. A video imaging system in accordance with claim 1, wherein the first threshold voltage monitor includes a polysilicon layer 1 monitor transistor.

3. A video imaging system in accordance with claim 1, further comprising a second threshold voltage monitor for providing a second monitor output signal indicative of the threshold voltage of the inject gate as modified by exposure to radiation, wherein the compensation circuit governs the driving voltage applied to the inject gate on the basis of the second monitor output signal.

4. A video imaging system in accordance with claim 1, wherein the array of photosensitive pixels is disposed within a remote head capable of exposure to at least one of non-ionizing and ionizing radiation.

5. A video imaging system in accordance with claim 4, wherein the remote head further includes radiation hardened electronics for driving the array of photosensitive pixels.

6. A video imaging system in accordance with claim 5, wherein the radiation hardened electronics include imager signal drivers for driving the array of photosensitive pixels based upon receipt of a start pulse.

7. A video imaging system in accordance with claim 4, wherein the remote head further includes a threshold compensation circuit for actively compensating drive signals supplied to the array of photosensitive pixels.

8. A video imaging system in accordance with claim 1, wherein the remote head is at least partially evacuated.

9. A video imaging system in accordance with claim 1, wherein the remote head further includes a cooler for maintaining a temperature of the array of photosensitive pixels within a specified range of temperature.

10. A video imaging system in accordance with claim 1, further comprising:
    d. a camera control unit for providing power and control signals to the array of photosensitive pixels and for processing signals received from the array of photosensitive pixels; and
    e. electronic coupling of the camera control unit to a remote head containing the array of photosensitive pixels.

11. A video imaging system in accordance with claim 10, wherein the electronic coupling includes an electrical cable.

12. A video imaging system in accordance with claim 11, wherein the camera control unit includes a cable length compensation circuit.

13. A method for imaging in a high-radiation environment, the method comprising:
    a. providing an array of photosensitive pixels, the array characterized by a temperature, each pixel including:
       (i) a sense gate for integrating photogenerated charge during the course of each frame;
       (ii) an inject gate for removing integrated charge from the sense gate via a lateral drain;
       (iii) an amplifier transistor for sampling voltage on the sense gate;
       (iv) a select transistor for addressing a particular pixel; and
       (v) a reset transistor for referencing the sense gate to a specified potential, the sense gate, amplifier transistor, select transistor and reset transistor, collectively constituting polysilicon layer 1 transistors, each of the polysilicon layer 1 transistors characterized by a respective threshold voltage;
    b. sampling voltage on the sense gate by means of the amplifier transistor associated with each photosensitive pixel;
    c. monitoring a change in threshold voltage associated with the array of photosensitive pixels in order to derive a threshold voltage monitor signal; and
    d. compensating a drive signal applied to the array of photosensitive pixels for changes in threshold voltage due to radiation exposure based upon the threshold voltage monitor signal.

14. A method in accordance with claim 13, further comprising maintaining the temperature of the array of photosensitive pixels within a specified range of temperature.

15. A method in accordance with claim 13, further comprising generating drive signals within a remote head that includes the array of photosensitive pixels based upon a start signal received from a camera control unit disposed at a distance greater than 2 meters from the remote head.

16. A method in accordance with claim 13, wherein the step of monitoring a change in threshold voltage includes monitoring a first threshold voltage of a first monitor transistor associated with a first polysilicon layer of the array of photosensitive pixels.

17. A method in accordance with claim 16, wherein the step of monitoring a change in threshold voltage further includes monitoring a second threshold voltage of a second monitor transistor associated with a second polysilicon layer of the array of photosensitive pixels.

\* \* \* \* \*